United States Patent [19]

Emura et al.

[11] Patent Number: 4,779,819

[45] Date of Patent: Oct. 25, 1988

[54] DRAG MECHANISM FOR FISHING REEL HAVING SPOOL SHAFT SUPPORTED AT BOTH ENDS THEREOF

[75] Inventors: Masaharu Emura; Takehiro Kobayashi, both of Hiroshima, Japan

[73] Assignee: Ryobi, Ltd., Japan

[21] Appl. No.: 75,999

[22] Filed: Jul. 21, 1987

[30] Foreign Application Priority Data

Jul. 21, 1986 [JP] Japan .................. 61-112479[U]

[51] Int. Cl.[4] ............................................. A01K 89/02
[52] U.S. Cl. .................... 242/218; 242/84.21 R
[58] Field of Search ................... 242/84.5 R, 84.51 R, 242/84.5 A, 84.51 A, 84.21 R, 211, 214, 216, 217, 218, 219, 220, 221, 84.4, 84.41, 84.42

[56] References Cited

U.S. PATENT DOCUMENTS

| 756,364 | 4/1904 | Hermance | 242/84.5 X |
| 1,172,422 | 2/1916 | Benjamin | 242/84.51 R X |
| 3,796,395 | 3/1974 | Rankin, Jr. | 242/84.5 R X |
| 4,278,217 | 7/1981 | Blackwell | 242/217 |
| 4,708,303 | 11/1987 | Emura et al. | 242/218 |

FOREIGN PATENT DOCUMENTS 60-7030  11/1985  Japan .

Primary Examiner—Stuart S. Levy
Assistant Examiner—Katherine Matecki
Attorney, Agent, or Firm—Finnegan, Henderson, Farabow, Garrett and Dunner

[57] ABSTRACT

A drag mechanism for a fishing reel having a drag positioned on a traversing cam shaft, a drag ratchet axially moveable on the traversing cam shaft to adjust the dragging force, an anti-reversing ratchet on the traversing cam shaft, a drag claw and an anti-reversing pawl to alternately engage and disengage the drag ratchet with the anti-reversing ratchet, respectively, and a rotatable drag switch lever causing such engagement and disengagement.

4 Claims, 4 Drawing Sheets

DRAG MECHANISM FOR FISHING REEL HAVING SPOOL SHAFT SUPPORTED AT BOTH ENDS THEREOF

BACKGROUND OF THE INVENTION

The present invention relates to fishing reels, and particularly, to a drag mechanism for a fishing reel having a spool shaft supported at both the ends thereof.

Previously, there has been proposed a drag mechanism for a fishing reel having a spool shaft supported at both ends. In such a drag mechanism, a drag is provided around a traversing cam shaft at a master gear. A handle can be attached to either of the ends of the traversing cam shaft operatively connected to the spool shaft through a transmission gear mechanism and supported by the right and left side frames of the body of the reel. A drag ratchet is attached to the traversing cam shaft and is coaxial therewith so that the frictional force of the drag can be adjusted by rotating the traversing cam shaft forward or backward. An anti-reversing ratchet is secured to the traversing cam shaft and is coaxial therewith. A drag claw and an anti-reversing pawl are supported so that the claw and the pawl can be alternately engaged with and disengaged from the drag ratchet and the anti-reversing ratchet, respectively, by the changeover action of a drag switch.

Since the drag switch is located on the side plate and cover plate of the side frame (the right side frame, for example) containing the drag mechanism, the cover plate of the left side frame is grasped by the left hand of the person using the reel, when the handle is operated with the person's right hand. For that reason, the drag switch is usually operated by the thumb or finger of the left hand. However, since the drag switch is located at the right side of the reel, the distance between the drag switch and the left hand makes it difficult to operate the drag switch by the thumb or finger of the left hand. This is a problem for the person using the reel.

SUMMARY OF THE INVENTION

The present invention was made in order to solve the above-mentioned problem.

In accordance with the present invention, the above problem is solved by providing a drag mechanism for a fishing reel having a spool shaft supported at each end thereof, a reel body including a first and a second side frame, a rotatable traversing cam shaft, having a first and a second end portion, operatively connected to the spool shaft through a transmission gear mechanism and supported at the ends thereof by the first and second side frames, which mechanism comprises a drag positioned on the traversing cam shaft near the first end portion; a drag ratchet attached to the traversing cam shaft and coaxial therewith; a moving means on said first end portion to cause the drag ratchet to move axially on the traversing cam shaft to adjust the dragging force of the drag when the cam shaft is rotated back and forth; an anti-reversing ratchet secured to the traversing cam shaft and coaxial therewith; a claw shaft rotatably supported in one of the side frames near the drag; a drag claw on the claw shaft to engage and disengage the drag ratchet; an anti-reversing pawl on the claw shaft to engage and disengage the anti-reversing ratchet; a drag switch lever operatively connected to the claw shaft to rotate said claw shaft so as to cause the drag claw and the anti-reversing pawl to alternately engage and disengage the drag ratchet and the anti-reversing ratchet, respectively; the drag switch lever having first and second ends rotatably supported by the first and second side frames, one end of the drag switch lever being secured to the claw shaft and the other end thereof being supported by the second side frame and a spring for urging the drag switch lever to rotate in a direction to disengage the drag claw from the drag ratchet.

The present invention provides a drag mechanism in which the alternate engagement and disengagement of the drag claw and the anti-reversing pawl with and from the drag ratchet and the anti-reversing ratchet are made by the drag switch. The drag switch lever, the central portion of which is fitted with the drag switch, is supported between, for example, the right and left side frames of the body of a fishinq reel having a spool shaft supported at both the ends thereof. This eliminates the difference between the operation of the reel with a handle on the right side of the reel and that of the reel with the handle on the left side of the reel so as to facilitate the increasing and decreasing of the drag on the reel.

The handle can be attached to either of the right or left ends of the traversing cam shaft movingly connected to the spool shaft through a transmission gear mechanism and supported by the right and left side frames of the body of the fishing reel. A drag is provided around the traversing cam shaft at a master gear. The drag ratchet is attached to the traversing cam shaft coaxially therewith so that the dragging force of the drag can be adjusted by rotating the traversing cam shaft forward or backward. The anti-reversing ratchet is secured to the traversing cam shaft coaxially therewith. The drag claw and the anti-reversing pawl are supported so that the claw and the pawl can be alternately engaged with and disengaged from the drag ratchet and the anti-reversing ratchet, respectively, by the changeover action of the drag switch. The drag claw and the anti-reversing pawl are attached to a claw shaft rotatably supported in the side frame near the drag, so that the claw and the pawl can be alternately switched for the engagement and the disengagement by the claw shaft. The drag switch lever is rotatably supported between the right and left side frames in such a manner that one end of the drag switch lever is secured to the claw shaft and the other end of the lever is supported by the side frame opposite the drag. A spring urges the drag switch lever in such a direction as to disengage the drag claw from the drag ratchet.

The drag switch lever is placed at the rear portion of the fishing reel in front of the fisherman using the reel, so that the drag switch can be operated by the thumb or finger of his hand grasping the fishing rod fitted with the reel, and palming or the like is facilitated.

Since the drag switch lever is pivotally supported at both the ends thereof by the claw shaft and a support shaft, the drag switch lever does not undergo inclination or the like but is rotatively operated surely and smoothly, no matter what part of the lever is picked to operate the lever. For that reason, the drag switch lever can be easily operated even by a child having small hands. The operating property of the drag mechanism is thus improved.

DESCRIPTION OF THE DRAWINGS

The present invention will be better understood by reference to the accompanying drawings, wherein.

DETAILED DESCRIPTION OF EXEMPLARY EMBODIMENT

An embodiment of the present invention is hereafter described in detail with reference to the drawings attached hereto.

Figure 1:
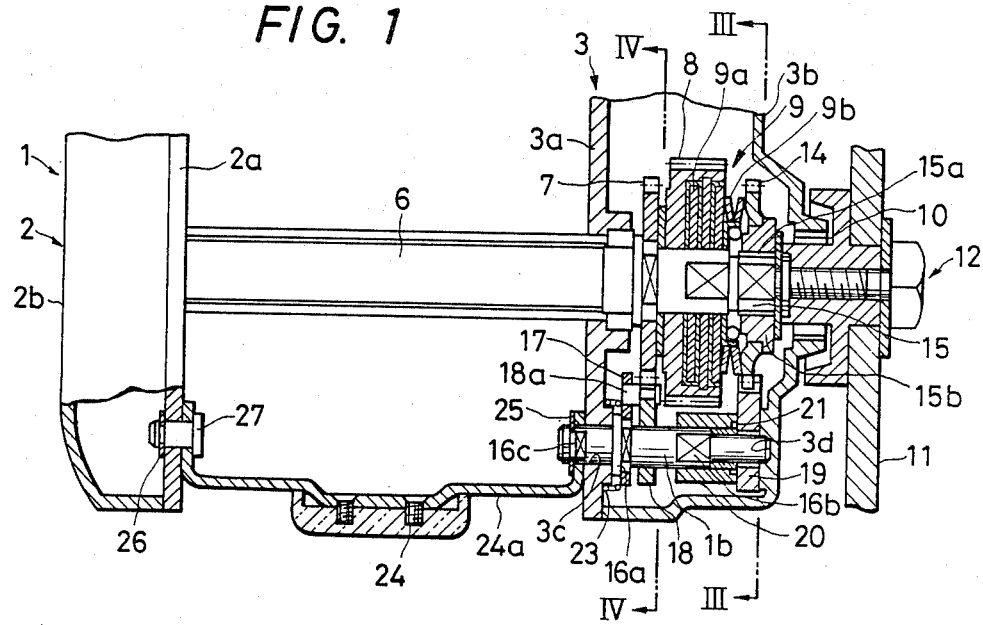
FIG. 1 shows a partial-cutaway longitudinal sectional plan view of a drag mechanism for a fishing reel in accordance with a present invention.
Figure 2:
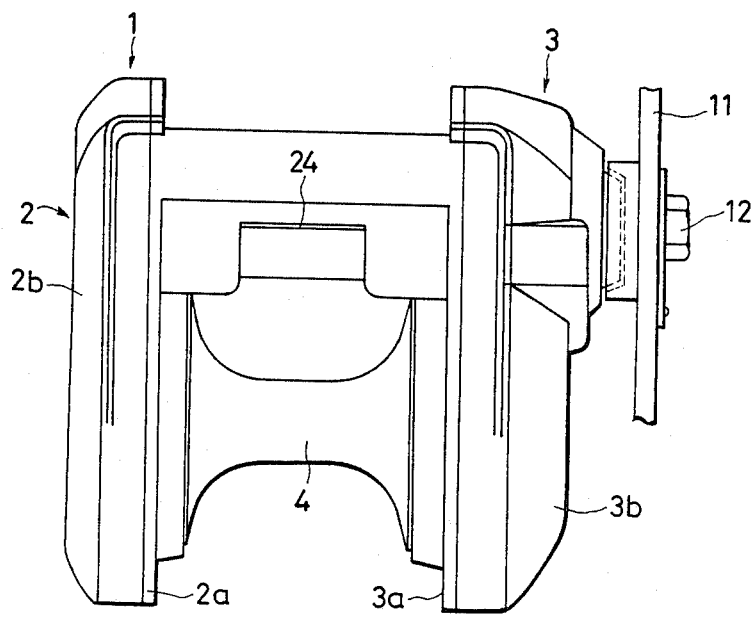
FIG. 2 shows a front view of the fishing reel including a drag mechanism in accordance with the present invention.

As shown in FIGS. 1 and 2, the body 1 of a fishing reel, which has a spool shaft 5 supported at both ends thereof, is made of a right and a left side frame 2 and 3, respectively, which are coupled to each other across a prescribed distance by one or more screws or the like and between which support bars and a member for attaching the reel to a fishing rod are provided (not shown). The side frames 2 and 3 include hollow side plates 2a and 3a, and cover plates 2b and 3b secured to the outsides of the side plates 2a and 3a by screws.

Figure 3:
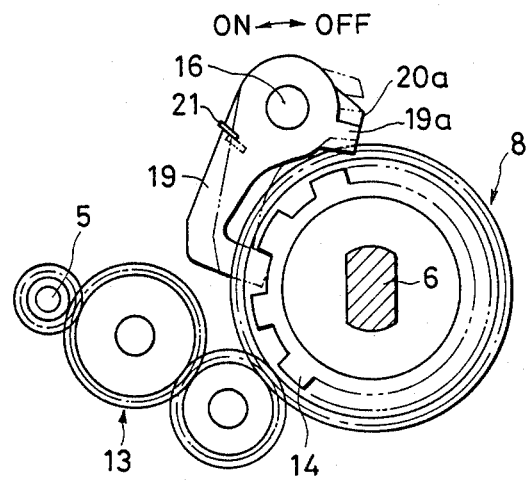
FIG. 3 shows a cross-sectional view along a line III—III shown in FIG. 1.
Figure 4:
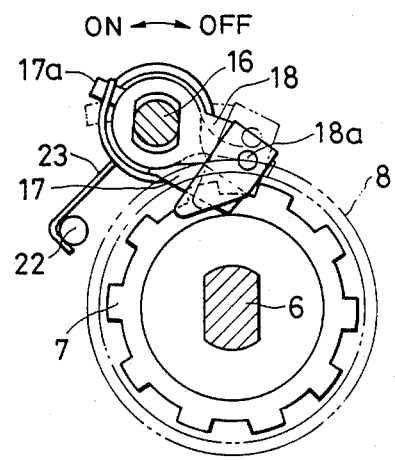
FIG. 4 shows a cross-sectional view along a line IV—IV shown in FIG. 1.
Figure 5:
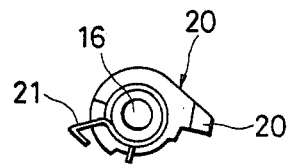
FIG. 5 shows a front view of a drag claw and a drag claw spring.

The spool shaft 5 shown in FIG. 3 and a traversing cam shaft 6 shown in FIGS. 1, 3 and 4 are supported at both the ends thereof by bearings in the side plates 2a and 3a so that a spool 4 and a level winding mechanism are rotatably supported in parallel with each other between the side frames 2 and 3.

An anti-reversing ratchet 7 is secured to one end portion of the traversing cam shaft 6, which extends out of the right side frame 3. A master gear 8 is rotatably attached to the end portion of the traversing cam shaft 6.

A plurality of drag washers 9a and a plurality of spring washers 9b are juxtaposed together on the traversing cam shaft 6 in the axial direction thereof at the right-hand side of the master gear 8 so as to constitute a drag 9.

Both the ends of the traversing cam shaft 6 are located at the openings 10 of the cover plates 2b and 3b of the side frames 2 and 3. A handle 11 can be removably coupled to either of both the ends of the traversing cam shaft 6 by a conventional coupling means 12 such as a screw. The traversing cam shaft 6 and the spool shaft 5 are operatively connected to each other through a transmission gear mechanism 13 including the master gear 8, so that the spool 4 is rotated by the handle 11. The level winding mechanism is a conventional one.

A drag ratchet 14 is provided on a moving means 15 on the end portion of the traversing cam shaft 6 at the drag 9 so that the drag ratchet can be moved forth (to the left) in the axial direction thereof to tighten, or increase, the dragging force of the drag 9, by rotating the traversing cam shaft forward, and can be moved back (to the right) in the axial direction thereof to loosen, or decrease the dragging force of the drag, by rotating the traversing cam shaft backward.

The moving means 15 may be a screw, a cam or the like. In this embodiment, the moving means 15 is made of a male screw 15a provided on the traversing cam shaft 6, and a drag nut 15b engaged with the male screw so as to be movable back and forth in the axial direction thereof. The drag ratchet 14 is secured to the outside surface of the drag nut 15b.

Figure 6:
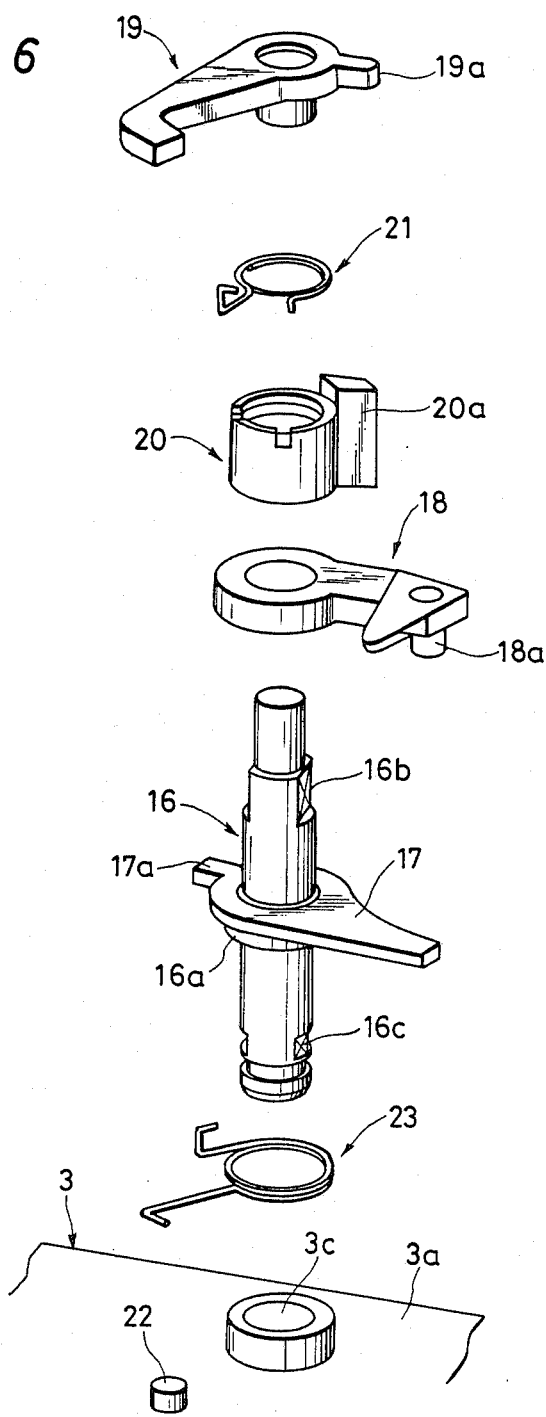
FIG. 6 shows a perspective exploded view of the major part of the embodiment.

As shown in FIGS. 1, 3, and 6, a claw shaft 16 is rotatably supported in the right side frame 3 at an appropriate distance from the traversing cam shaft 6 in parallel therewith. A flange 16a is provided near one end of the claw shaft 16. While the cover plate 3b is removed, the end of the claw shaft 16 is inserted through the shaft hole 3c of the side plate 3a so that the flange 16a is butted to the side plate. After that, the cover plate 3b is secured to the side plate 3a, and the other end of the claw shaft 16 is fitted in the bottom shaft hole 3d of the inside surface of the cover plate 3b so that the claw shaft is kept from moving in the axial direction thereof.

A plate 17 is calked to the claw shaft 16. An anti-reversing pawl 18 is movably fitted on the claw shaft 16 so that the pawl can be engaged with and disengaged from the anti-reversing ratchet 7. When the plate 17 is rotated together with the claw shaft 16 in a direction ON shown in FIG. 4, so that the plate collides against a pin 18a projecting from the pawl 18, the pawl is disengaged from the anti-reversing ratchet 7.

A drag claw 19 is movably fitted on the claw shaft 16 so that the drag claw can be engaged with and disengaged from the drag ratchet 14. A drag claw cam 20 is fixedly fitted on the notched circular portion 16b of the claw shaft 16.

A drag claw spring 21 is applied to the drag claw cam 20 in such a direction as to keep the projection 20a of the drag claw cam in contact with the projection 19a of the drag claw 19. The drag claw spring 21 urges the drag claw 19 toward the drag ratchet 14 and the projection 20a of the drag claw cam 20 keeps the drag claw disengaged from the drag ratchet 14.

A spring 23 is provided for the plate 17 in such a manner that one end of the spring is engaged with a spring bearer 22 on the side plate 3a and the other end of the spring is engaged with the projection 17a of the plate. The spring 23 urges the plate 17 in a direction OFF shown in FIG. 4, to engage the pawl 18 with the anti-reversing ratchet 7.

The end portion of the claw shaft 16, which extends inward from the side plate 3a, is provided with a notched circular part 16c on which one end of a drag switch lever 24a, the longitudinal section of which is shaped as flat U is fixedly fitted. An E-ring 25 is fitted on the end portion of the claw shaft 16 inside the drag switch lever 24a so that the lever is prevented from coming off, and the E-ring is rotated together with the claw shaft 16. The other end of the drag switch lever 24a is rotatably supported to the side plate 2a of the other side frame 2 by a supported shaft 27 which is coaxial with the claw shaft 16, so that another E-ring 26 prevents the other end of the drag switch lever from coming off. As a result, the drag switch lever 24a is supported between the right and the left side frames 2 and 3 so that the drag switch lever can be turned up or down.

A drag switch 24 is attached to the central portion of the drag switch lever 24a. The drag switch lever 24a and the claw shaft 16 and the support shaft 27, which support the drag switch lever, should be located on the side toward the person using the reel (opposite the level winding mechanism) of the reel so that the drag switch can be rotatively operated by the thumb or finger of the person's hand grasping the fishing rod fitted with the reel and not shown in the drawings. The spring 23 urging the plate 17 also urges the drag switch lever 24a in an upward direction (with regard to FIG. 2) so as to engage the anti-reversing pawl 18 with the anti-reversing ratchet 7 and disengage the drag claw 19 from the drag ratchet 14 to turn off the drag 9.

When the drag switch 24 is turned down toward the person using the reel in the direction ON, as shown in FIG. 4, against the force of the spring 23 acting to the plate 17 and urging the drag switch lever 24a to turn off the drag 9, the plate 17 is swung in the direction ON through the action of the claw shaft 16 so that the plate collides against the pin 18a of the anti-reversing pawl 18. As a result, the pawl 18 is disengaged from the anti-reversing ratchet 7. At the same time, the drag claw cam 20 is turned in a direction ON in FIG. 3 by the claw shaft 16 so that the projection 20a which keeps the drag claw 19 from rotating is separated from the projection 19a of the drag claw 19. As a result, the drag claw 19 is pushed and moved toward the drag ratchet 14 by the drag claw spring 21 so that the drag claw 19 is engaged with the drag ratchet 14. The frictional force of the drag 9 can then be adjusted by rotating the handle 11 forward or backward.

When the drag switch 24 is released from the hand of the person using the reel after the adjustment of the dragging force, the drag switch lever 24a is returned to its original, normal position by the spring 23 so that the drag claw 19 is disengaged from the drag ratchet 14 and the anti-reversing pawl 18 is engaged with the anti-reversing ratchet 7.

Having described a preferred embodiment of the present invention, it is understood that variations and modifications thereof falling within the scope of the appended claims may become apparent to one skilled in the art.

What is claimed is:

1. A drag mechanism for a fishing reel having a spool shaft supported at each end thereof, a reel body including a first and a second side frame, a rotatable traversing cam shaft having a first and a second end portion and being operatively connected to the spool shaft through a transmission gear mechanism and supported at the ends thereof by said first and second side frames, which mechanism, comprises:
   a drag positioned on said traversing cam shaft near said first end portion;
   a drag ratchet attached to said traversing cam shaft and coaxial therewith and moving means on said first end portion for engaging said drag ratchet and moving said drag ratchet axially on said traversing cam shaft to adjust the dragging force of said drag;
   an anti-reversing ratchet secured to said traversing cam shaft and coaxial therewith;
   a claw shaft rotatably supported in said first side frame near said drag;
   a drag claw on said claw shaft to engage and disengage said drag ratchet;
   an anti-reversing pawl on said claw shaft to engage and disengage said anti-reversing ratchet;
   a drag switch lever connected to said claw shaft for rotating said claw shaft to cause said drag claw and said anti-reversing pawl to alternatively engage and disengage the drag ratchet and said anti-reversing ratchet, respectively; said drag switch lever having first and second ends rotatably supported by said first and second side frames, one end of said drag switch lever being secured to said claw shaft and the other end thereof being supported by said second side frame; and
   a first spring for urging said drag switch lever to rotate in a direction to disengage said drag claw from said drag ratchet.

2. The drag mechanism of claim 1, wherein said claw shaft is spaced apart from and parallel with said traversing cam shaft.

3. The drag mechanism of claim 1, further including a second spring for applying force to said drag claw to urge said drag claw toward said drag ratchet.

4. The drag mechanism of claim 1, further including a drag switch attached to said drag switch lever which when released permits said drag switch lever to be returned by said first spring to a normal position at which said drag claw is disengaged from said drag ratchet and said anti-reversing pawl is engaged with said anti-reversing ratchet.

* * * * *